(12) United States Patent
Griffin, Jr. et al.

(10) Patent No.: US 8,505,718 B2
(45) Date of Patent: Aug. 13, 2013

(54) PORTABLE ELECTRONIC DEVICE CASE CONFIGURATION

(75) Inventors: Paul P. Griffin, Jr., Nashville, TN (US); Jason C. Collins, Franklin, TN (US)

(73) Assignee: Griffin Technology, Inc., Nashville, TN (US)

( * ) Notice: Subject to any disclaimer, the term of this patent is extended or adjusted under 35 U.S.C. 154(b) by 878 days.

(21) Appl. No.: 11/786,834

(22) Filed: Apr. 13, 2007

(65) Prior Publication Data

US 2008/0251512 A1 Oct. 16, 2008

(51) Int. Cl.
*B65D 85/00* (2006.01)

(52) U.S. Cl.
USPC .......................................................... 206/320

(58) Field of Classification Search
USPC ............. 206/320, 216, 316.1, 223; 220/4.21, 220/4.02, 4.26, 287; 150/165; 361/600, 361/679.01; 455/575.1, 575.8
See application file for complete search history.

(56) References Cited

U.S. PATENT DOCUMENTS

| | | | | |
|---|---|---|---|---|
| 4,089,464 A | * | 5/1978 | Teti et al. | 220/4.01 |
| 4,177,634 A | * | 12/1979 | Calienes | 368/232 |
| 6,308,831 B1 | * | 10/2001 | Saxe et al. | 206/449 |
| 6,367,623 B1 | * | 4/2002 | Tully et al. | 206/232 |
| 7,577,468 B2 | * | 8/2009 | Begic et al. | 455/575.8 |
| 7,594,576 B2 | * | 9/2009 | Chen et al. | 206/320 |
| 8,395,894 B2 | * | 3/2013 | Richardson et al. | 361/679.55 |
| 2004/0064326 A1 | * | 4/2004 | Vaghi | 705/1 |
| 2005/0247584 A1 | * | 11/2005 | Lu | 206/320 |
| 2006/0086062 A1 | * | 4/2006 | Ashworth | 53/397 |
| 2008/0053851 A1 | * | 3/2008 | Ko et al. | 206/320 |
| 2008/0053852 A1 | * | 3/2008 | Ko et al. | 206/320 |
| 2008/0119244 A1 | * | 5/2008 | Malhotra | 455/575.1 |
| 2010/0116387 A1 | * | 5/2010 | Channey et al. | 150/165 |
| 2011/0228458 A1 | * | 9/2011 | Richardson et al. | 361/679.01 |

* cited by examiner

*Primary Examiner* — Luan K Bui
*Assistant Examiner* — Rafael Ortiz
(74) *Attorney, Agent, or Firm* — Hornkohl Intellectual Property Law PLLC; Jason L. Hornkohl

(57) ABSTRACT

A case assembly adapted to be assembled into a case for a portable electronic device has a single case front and multiple case backs packaged for sale in a single package. The case front is adapted to mate with each of the case backs to form a case dimensioned to hold a different size of portable electronic device. The case front has an opening such that a control of the portable device can be accessed through the case front. A two-way, mirrored finished may be constructed on the front such that light emitting elements of the case and display can only be viewed thorough the case exterior when the elements are lit. The case front and back form openings for the input/and outputs of the device when coupled together. A case back with and without a belt-clip or armband may be included.

13 Claims, 5 Drawing Sheets

PORTABLE ELECTRONIC DEVICE CASE CONFIGURATION

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention is directed toward an improved case configuration for an electronic device. More particularly, a preferred embodiment of the present invention is directed toward a case designed with multiple, modular pieces such that the case can accommodate different types of devices and case configurations in a single package with minimal excess components and production costs.

BACKGROUND OF THE INVENTION

Cases are commonly used to carry a variety of portable electronic devices such as digital music players, cellular telephones, personal computers, data assistants, etc. Unfortunately, these cases suffer from a number of drawbacks, particularly in the eyes of manufacturers, designer and retailers. One example of such a draw back is that there are multiple types of devices having different dimensions and outputs such that a different case must be produced and stocked for each type of device. This increases the costs of the cases since the tooling and design costs must be recouped through fewer numbers of sales. In addition, consumers typically like personalized, customized cases that express their individual tastes and needs. This also further increases the number of cases that must be designed and stocked. Therefore, what is needed is an inexpensive manner of creating a large number of case designs.

Many cases also suffer from the draw back that the device's outputs, display and controls are not easily accessible through the case's exterior. Since each type of device tends to have a different configuration with respect to their inputs and outputs, even devices that are similarly sized may require different case configurations to accommodate their particular set of inputs and outputs. Therefore, what is needed is an improved case design that can accommodate multiple types of devices and design configurations while utilizing a minimum number of components for ease of manufacture, assembly and display.

SUMMARY OF THE INVENTION

An embodiment of the present invention is directed toward a case for carrying an electronic device. The case can be configured to carry one of a first and a second electronic device. The first electronic device has different dimensions than the second electronic device. The case includes a primary case portion configured to mate with a first secondary case portion to form a case dimensioned to substantially enclose the first electronic device. The primary case portion is also configured to mate with a second secondary case portion to form a case dimensioned to substantially enclose the second electronic device. The primary case portion is packaged and sold with both the first and second secondary case portions. At least one of the case portions preferably has a translucent portion. The case portion having the translucent portion is adapted to receive an insert such that the insert is visible through the translucent portion when the case portion having the translucent portion is used to enclose the first or second electronic devices. The primary case portion and the secondary case portions are packaged with at least two inserts such that a purchaser of the case portions can select an insert to mount such that the selected insert is visible through the translucent portion. A two-way mirrored surface is positioned on the primary case portion such that a display of the device can be viewed through the two-way mirrored surface when the device is in the case. The case also includes an opening such that an input or output of the device can be accessed when the device is in the case.

Another embodiment of the present invention is directed toward a case assembly adapted to be assembled into a case for a digital video/music player that is preferably packaged for sale in a single package. The case assembly includes a case front, a first case back and a second case back. The case front is adapted to mate with the first case back to form a case dimensioned to hold a first size of digital video/music player. The case front is also adapted to mate with the second case back to hold a second size of digital video player. Alternatively, the second case back may have a belt clip while the first case back does not. The case front and the first and second case backs have coupling portions constructed thereon such that the case front can be removably fastened to one of the first and second case backs. The case front has an opening such that a control of the digital video player can be accessed through the case front. The case has a rubberized exterior finish.

Yet another embodiment of the present invention is directed toward a case assembly that includes a mounting portion adapted to couple with one of a first and a second sizing portion. The case assembly forms a case adapted to enclose a first size digital music player when the mounting portion is coupled to the first sizing portion and the case assembly forms a case adapted to enclose a second size digital music player when the mounting portion is coupled to the second sizing portion. The mounting portion and one of the first and the second sizing portions are preferably coupled through mating projections and cavities that form a friction fit. The mounting portion has an opening such that a user can access a control of the digital music player when the digital music player is enclosed between the mounting portion and the sizing portion. An opening for an input or output is formed along a junction of the mounting portion with one of the first and second sizing portions. The mounting portion has a mirrored finish such that a display of the digital music player can only be seen when the display is lighted. An insert can be mounted between one of the sizing portions and the digital music player when the digital music player is enclosed in the case such that the insert can be viewed through the sizing portion.

DETAILED DESCRIPTION OF THE INVENTION

Figure 1:
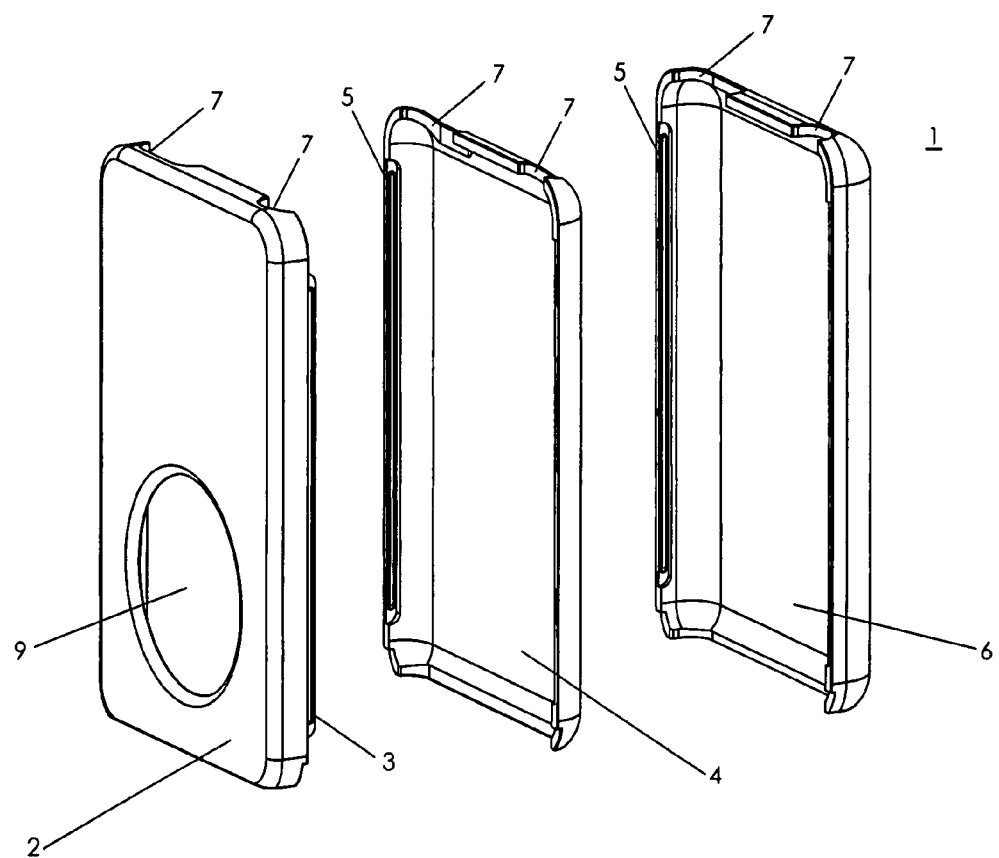
FIG. 1 is an exploded front view of a device case constructed in accordance with a first embodiment of the present invention.

Referring now to FIG. 1, an exploded front view of a device case constructed in accordance with a first embodiment of the present invention is shown. The case 1 consists of a single front part 2 and first 4 and second 6 back parts. In the embodiment shown, the first back part 4 is configured for a 30G video iPod™ which is thinner than a 60G/80G video iPod™. The second back part 6 is configured such that when mated with the front part 2 the case is dimensioned for the thicker 60G video iPod™. When the case 1 is assembled, only the appropriate back part 4 or 6 is mated to the front part 2.

Figure 2:
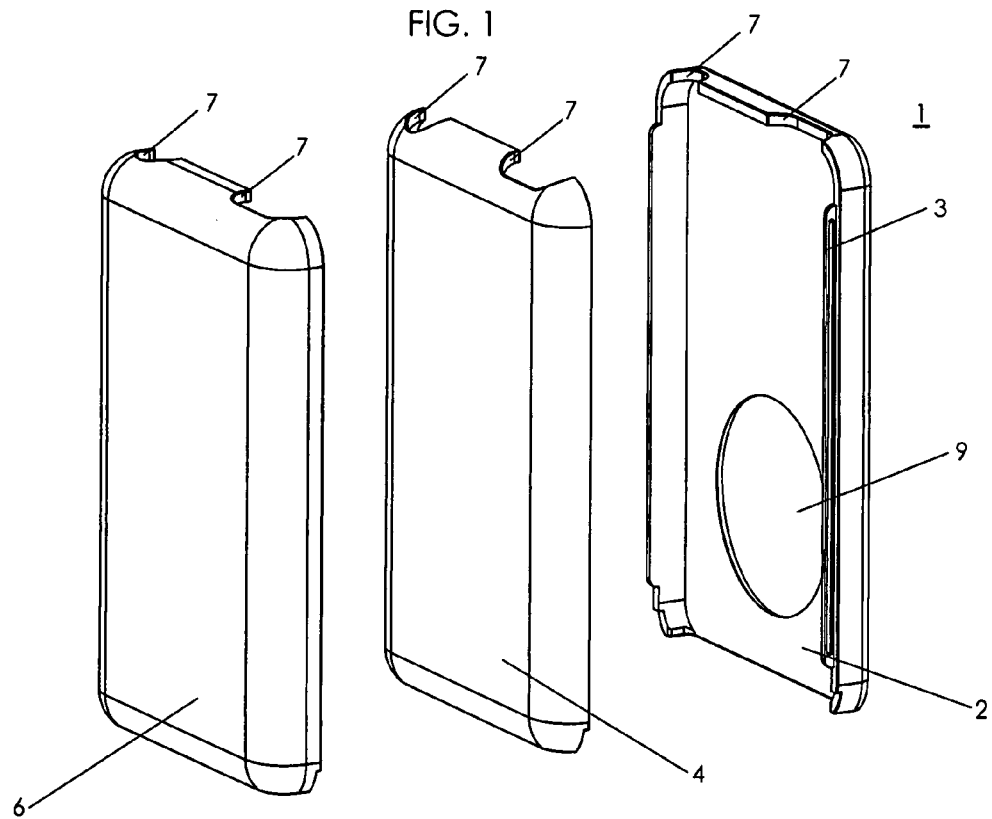
FIG. 2 is an exploded back view of a device case constructed in accordance with a first embodiment of the present invention.

FIG. 2 is an exploded back view of the device case of FIG. 1. Mating projections 3 running parallel to the edges of the case front 2 form a friction fit with corresponding mating cavities 5 on the edges of the case backs 4 and 6 such that the parts are removably connected with no adhesives or fasteners needed. The mated portions form connector openings 7 such that the device's various output ports, such as power, audio, video, etc., can be accessed while the device is contained within the protective case 1.

The case of FIGS. 1 and 2 is beneficial in that it can accommodate devices having controls and/or a display positioned on the exterior of the device. An opening 9 is provided on the case front 2. The opening 9 allows a user to access the controls of the device while the device is contained within the case 1. Also, since the device controls are recessed from the exterior surface of the case front 2 when the device is in the case, the controls have a degree of protection if the device is dropped. Both the iPod™ 30G and the iPod™ 60G have the same controller so the single opening 9 is effective. If the relevant devices have different sized controls, an opening corresponding to the largest set of controls can be used. Alternatively, punch outs can be provided such that a user can alter the dimension of the opening 9 to accommodate the various control layouts. The case front 2 is preferably constructed from a clear material so that the display of the device can be seen through the case front 2.

The dual back feature is beneficial in a number of manners. First, modern electronic devices such as cellular telephones and digital music players typically have a length and height dimensioned to fit in the pocket of a user. The variation in the dimensions between different device versions is often only in the width of the device. More complex or powerful devices require more components and space and, thus, the approximately 2"×4" dimensioned device is made thicker to accommodate the additional components. The embodiment of FIG. 1 is beneficial in that a two piece hard case for one of two different types of devices can be provided in only three pieces. Thus, less molds need to be made and the manufacturing costs are minimized. Also, modern retail shelf space is very valuable and stocking multiple cases for each variation of a device needlessly consumes shelf space. However, by packaging the three pieces of FIG. 1 in a single package, less shelf space is wasted. In addition, since the front piece, which typically has the most expensive finish, will be used, only one less expensive, non-used piece is left when the purchaser assembles their desired type of case. Thus, the number of unused components is minimized.

Figure 3:
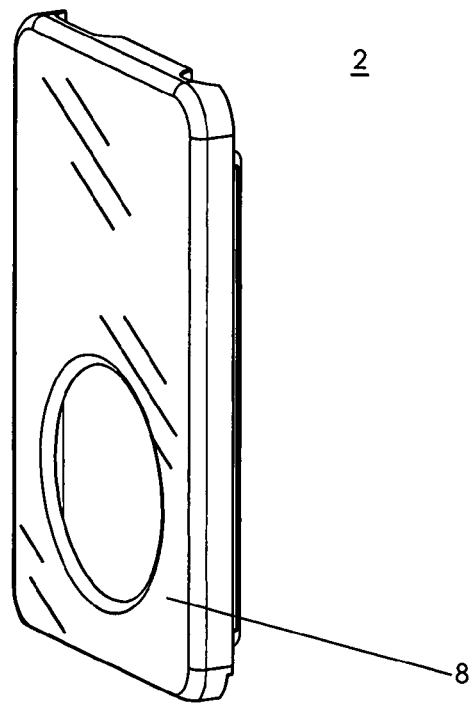
FIG. 3 is an illustration of a case front constructed in accordance with an embodiment of the present invention having a mirrored finish.

Referring now to FIG. 3, a case front 2 having a mirrored finish 8 is shown. The mirrored finish 8 is formed by vacuum coating the case exterior with a reflective material. The mirrored finish 8 is preferably a two way mirror. Thus, light producing elements such as light emitting diodes, electroluminescent materials, fiber optics, etc. that are positioned on the device or constructed integrally in the case can only be viewed through the mirrored finish 8 when the light source is activated. If the device has a lighted display, the display only becomes visible behind the mirrored finish 8 when the display is lit. This provides a unique user experience in that the display seems to simply appear when turned on.

Figure 4:
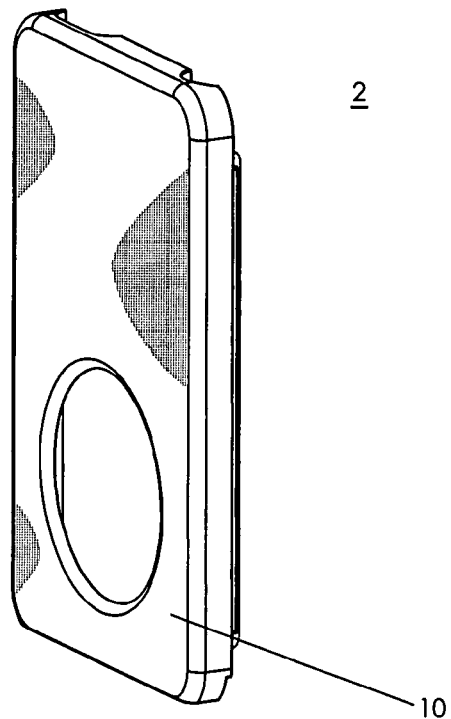
FIG. 4 is an illustration of a case front constructed in accordance with an embodiment of the present invention having a rubberized finish.
Figure 5:
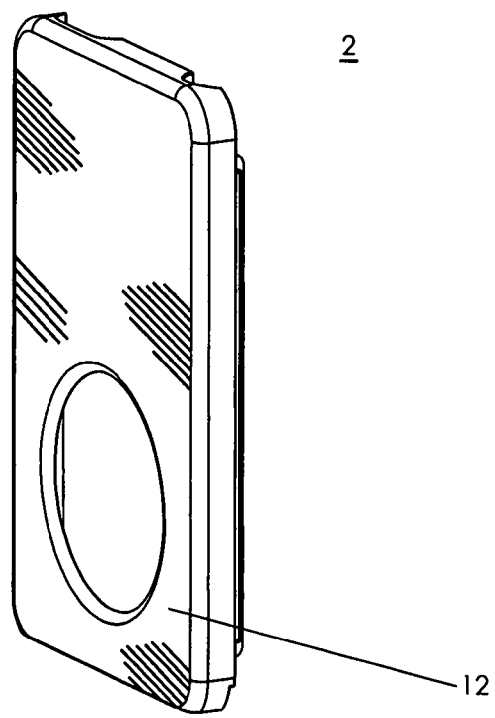
FIG. 5 is an illustration of a case front constructed in accordance with an embodiment of the present invention having a non-slip coating.
Figure 6:
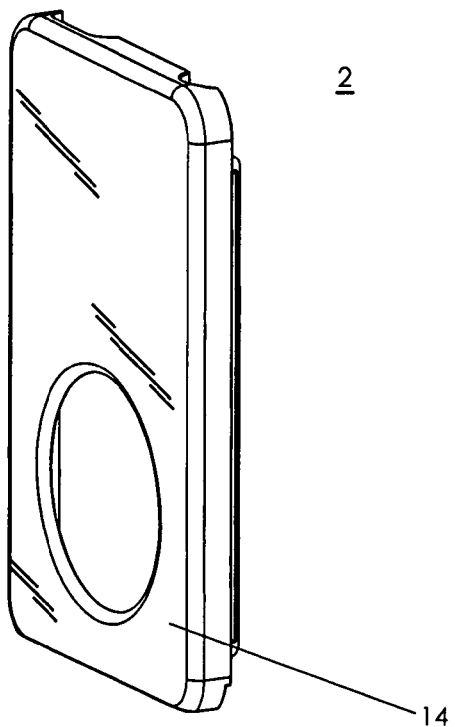
FIG. 6 is an illustration of a case front constructed in accordance with an embodiment of the present invention having an iridescent finish.

FIG. 4 shows a case front 2 having a rubberized finish 10. The rubberized finish 10 is formed by rubber printing the exterior of the case. The rubberized finish 10 provides a pleasing texture and helps prevent the case from sliding along smooth surfaces. Both the mirrored finish 8 and the rubberized finish 10 can be formed on a case constructed from using the same molds. In addition, since only one front piece 2 is preferably included, the additional finishing costs associated with preparing and applying the finishes are not incurred for multiple front pieces. This is particularly beneficial when the multiple back pieces do not require the specialized finish such as with the see-through, mirrored finish 8. Thus, the costs of producing a wide range of different case designs and the corresponding costs passed on to the consumer are reduced. Additional desirable finishes for use with a case constructed from rubber print are a non-slip coating 12, as shown in FIG. 5, and an iridescent finish 14 shown in FIG. 6.

Figure 7:
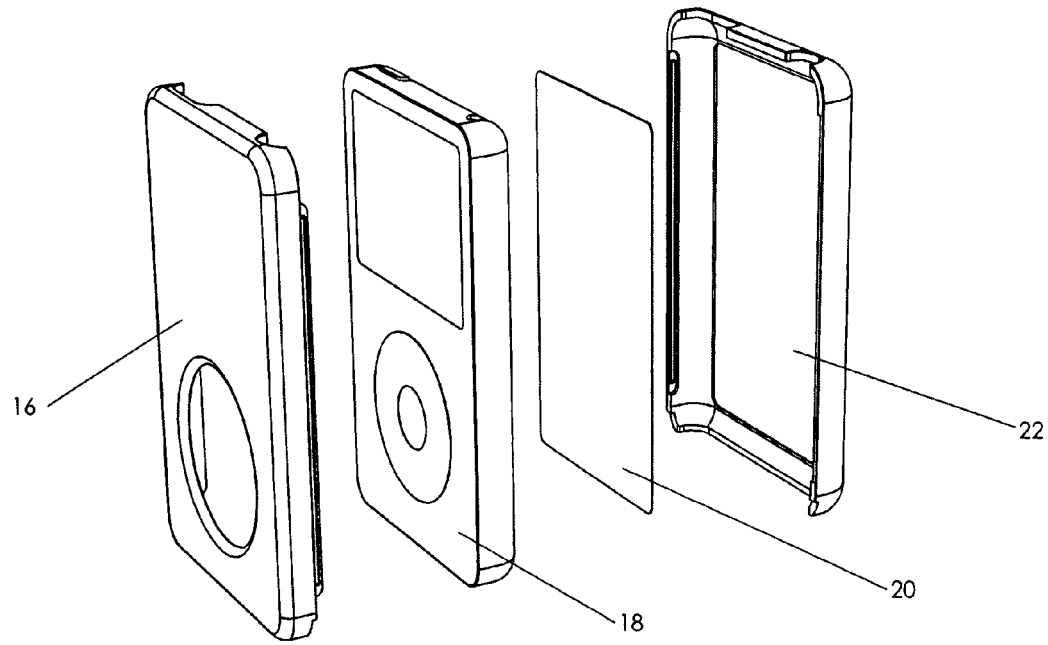
FIG. 7 is an exploded front view of a device case constructed in accordance with an embodiment of the present invention that is configured to receive an insert.
Figure 8:
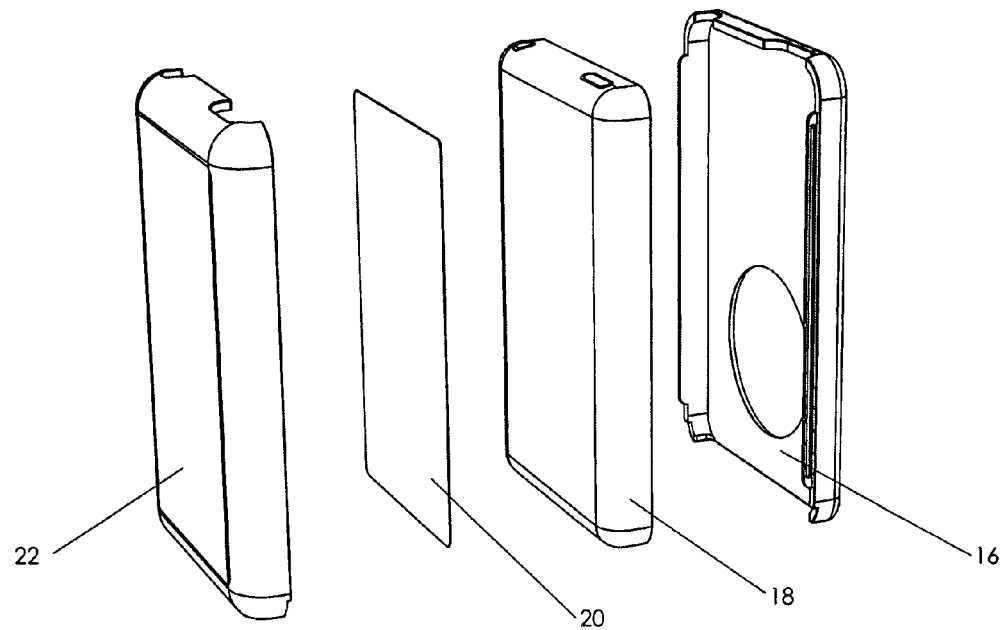
FIG. 8 is an exploded back view of a device case constructed in accordance with an embodiment of the present invention having a picture insert.

In addition to accepting a wide range of finishes applied to its surface, inserts can be placed behind the front and back of a case constructed in accordance with a preferred embodiment of the present invention. Referring now to FIG. 7, an exploded front view of a device case that is configured to receive an insert 20 is shown. The case front 16 fits over the front of the portable electronic device 18. A picture or patterned insert 20 is placed between the back 22 of the case and the portable electronic device 18. The case back 22 is constructed from a clear material such that in the insert can be viewed through the case back 22 when the case is assembled. FIG. 8 is an exploded back view of the device case of FIG. 7. An additional insert can be formed for the case front 16 if desired by cutting out portions of the front insert such that the device's display can be seen and the device controls accessed.

Figure 9:
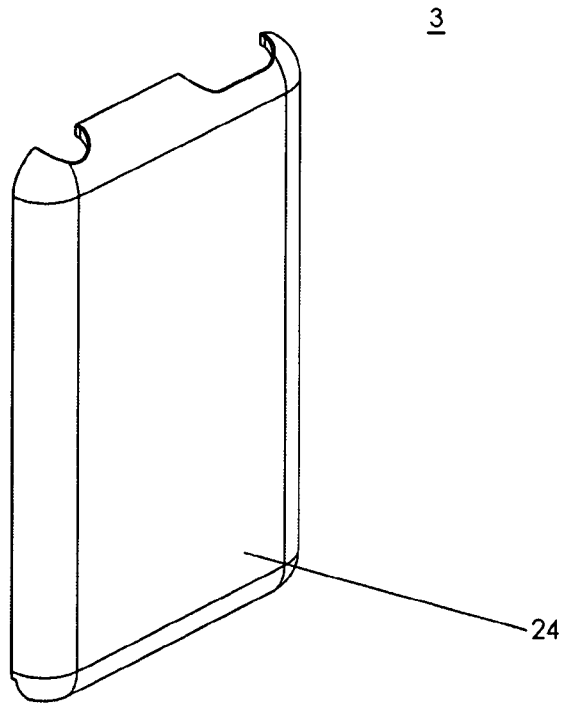
FIG. 9 is an illustration of an interchangeable case back without a belt clip 24 constructed in accordance with an embodiment of the present invention.
Figure 10:
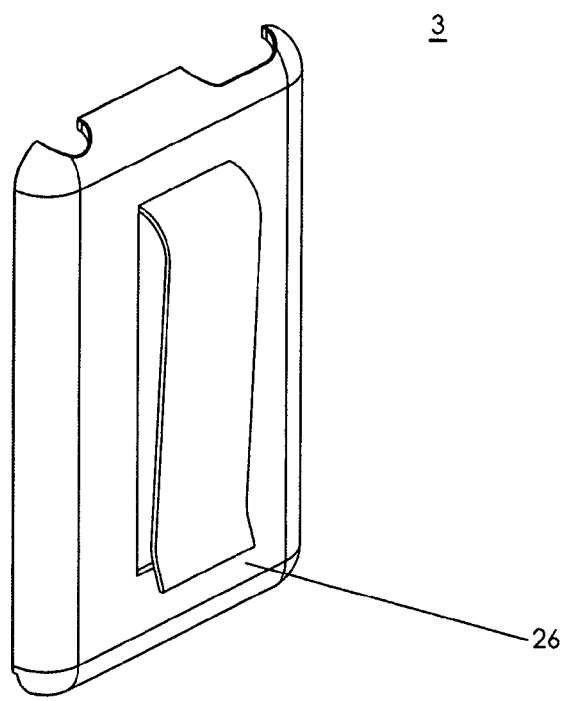
FIG. 10 is an illustration of an interchangeable case back without a belt clip 24 constructed in accordance with an embodiment of the present invention.

Referring now to FIGS. 9 and 10, illustrations of an interchangeable case back without a belt clip 24 and with a belt clip 26 that are adapted to mate with a single case front and constructed in accordance with an embodiment of the present invention as described herein are shown. The provision of a case back with 26 and without 24 a belt clip allows a single front piece to be used to create two different case configurations. If packaged together, the case backs 24 and 26 allow a user to choose their preferred case configuration without the need to purchase multiple cases. If packaged separately, the case backs 24 and 26 allow a manufacturer to provide two different two piece cases from a total of three manufactured components. Thus, the embodiment shown in FIGS. 9 and 10 provides the advantages described above with respect to tooling, designing and packaging. In addition, when combined with the different dimensioned case backs and fronts described herein, a modular cased design is created that can be used in connection with a number of different types and sizes of devices to create cases that satisfy an individual's case preferences without requiring costly multiple designs.

Although there have been described particular embodiments of the present invention of a new and useful IMPROVED PORTABLE ELECTRONIC DEVICE CASE CONFIGURATION, it is not intended that such references be construed as limitations upon the scope of this invention except as set forth in the following claims.

The invention claimed is:

1. A case for carrying an electronic device wherein said case is capable of carrying one of a first and a second electro device, said case comprising:
   a first secondary case portion;
   a second secondary case portion; and
   a primary case portion that mates with said first secondary case portion to form a first device case dimensioned to substantially enclose the first electronic device wherein said primary case portion can be disconnected from said first secondary case portion and mated with said second secondary case portion to form a second device case dimensioned to substantially enclose the second electronic device;
   wherein an internal volume of said first device case is smaller than an internal volume of said second device case;
   wherein said primary case portion has a mating portion and said mating portion is used to alternatively couple said primary case portion with said first secondary case portion or said second secondary case portion;
   wherein one of said primary case portion and said secondary case portion includes an opening such that a user control of an electronic device can be accessed through said opening when the electronic device is enclosed within said primary case portion and one of said secondary case portions;
   wherein, said first secondary case portion is not used when said second secondary case portion is used; and
   wherein an output port of an electronic device can be accessed through an opening in said case when the electronic device is enclosed within said primary case portion and one of said secondary case portions.

2. The case of claim 1 further comprising a single package that contains said primary case portion and said first and second secondary case portions.

3. The case of claim 1 wherein at least one of said case portions has a translucent portion and said case portion having said translucent portion is adapted to receive an insert, such that said insert is visible through said translucent portion when said case portion having said translucent portion is used to enclose the first or second electronic devices.

4. The case of claim 3 further comprising a single package that contains said primary case portion and said secondary case portions and at least two inserts such that a purchaser of said case portions can select an insert to mount such that said selected insert is visible through said translucent portion.

5. The case of claim 1 further comprising a two way mirrored surface positioned such that a display of a device is visible through said two way mirrored surface when the device is turned on and is in said case.

6. A case assembly adapted to be assembled into a case for a portable electronic device wherein said case assembly is packaged for sale in a single package, said case assembly comprising:
   a case front;
   a first case back; and
   a second case back having a belt clip on a back portion thereof;
   wherein said case front has a mating portion that mates with either said first case back to form a case dimensioned to hold the portable electronic device or said second case back to form a case dimensioned to hold the portable electronic device having a belt clip;
   wherein said first case back cannot be used or mated with said case front when said second case back is mated with said case front; and
   wherein an internal volume of a first case formed by said case front said first case back is smaller than an internal volume of a second case formed by said case front and said second case back.

7. The case assembly of claim 6 wherein said case front has an opening such that a control of the portable device can be accessed through said case front.

8. The case assembly of claim 6 wherein said case front has a mirrored finish.

9. A case assembly comprising:
   a first mating case portion;
   a second mating case portion; and
   a primary case portion adapted to alternatively couple with either one of said first and second mating case portion wherein said case assembly forms a case that can enclose a first size portable electronic device when said primary case portion is coupled to said first mating case portion and said case assembly forms a case that can enclose a second size portable electronic device when said primary case portion is coupled to said second mating case portion;
   wherein said primary case portion includes an opening that corresponds to a user control of electronic device enclosed within said primary case portion and one of said first or second mating case portions such that the user control can be accessed when the electronic device is enclosed within said primary case portion and one of said first and second mating case portions;
   wherein an internal volume of a first device case formed by said primary case portion and said first mating case portion is smaller than an internal volume of a second device case formed by said primary case portion and said second mating case portion;
   wherein said primary case portion has a mating portion and said mating portion is used to alternatively mate said primary case portion with said first mating case portion or said second mating case portion; and
   wherein said first mating case portion cannot be used when said second mating case portion is used.

10. The case assembly of claim 9 wherein an opening for a device input or output is formed along a unction of said primary case portion with one of said first and second mating case portions.

11. The case assembly of claim 9 wherein said primary case portion has a two way mirrored finish.

12. The case assembly of claim 9 wherein an insert can be mounted between said one of said mating case portions and said portable electronic device when the portable electronic device is enclosed in said case such that said insert can be viewed through said mating case portion.

13. The case assembly of claim 9 wherein said mating portion further comprises mating projections and cavities that form a friction fit.

* * * * *